(12) United States Patent
Li et al.

(10) Patent No.: US 8,798,791 B2
(45) Date of Patent: Aug. 5, 2014

(54) ROBOT CONTROL SYSTEM AND METHOD

(75) Inventors: Shen-Chun Li, New Taipei (TW);
Shou-Kuo Hsu, New Taipei (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 306 days.

(21) Appl. No.: 13/217,251

(22) Filed: Aug. 25, 2011

(65) Prior Publication Data

US 2012/0165978 A1    Jun. 28, 2012

(30) Foreign Application Priority Data

Dec. 28, 2010 (TW) .............................. 99146251 A

(51) Int. Cl.
*G05D 3/00* (2006.01)
(52) U.S. Cl.
USPC .......................................... 700/248; 718/103
(58) Field of Classification Search
USPC ......... 700/248, 249, 247, 101, 102, 100, 103, 700/245, 264; 718/103, 104, 1, 100, 102; 318/567, 568.16
See application file for complete search history.

(56) References Cited

U.S. PATENT DOCUMENTS

| 6,580,979 | B2 * | 6/2003 | Payton et al. ................... 701/25 |
| 7,054,716 | B2 * | 5/2006 | McKee et al. ................. 700/245 |
| 7,765,028 | B2 * | 7/2010 | Orita ............................. 700/248 |
| 8,027,750 | B2 * | 9/2011 | Orita et al. .................... 700/253 |
| 2012/0150345 | A1 * | 6/2012 | Baltes et al. .................. 700/245 |

* cited by examiner

*Primary Examiner* — Dalena Tran
(74) *Attorney, Agent, or Firm* — Novak Druce Connolly Bove + Quigg LLP

(57) ABSTRACT

A cloud server and method controls one or more robots. The cloud server receives location information of each robot. A robot closest to a task location where a task is taken according to the location information. The cloud server of the data center sends a command to the located robot to move to the task location, where the command defines a task of the located robot to perform.

15 Claims, 3 Drawing Sheets

ROBOT CONTROL SYSTEM AND METHOD

BACKGROUND

1. Technical Field

The embodiments of the present disclosure relate to cloud computing technology, and particularly to a robot control system and method for controlling robots via cloud computing.

2. Description of Related Art

Automation reduces the need for human labor in the production of goods and services. A robot (e.g., a mobile robot or an industrial robot) is often used in automation. For example, manufacturers may use a plurality of industrial robots to assemble a car. However, at present, each robot is controlled by a control system that installed in a fixed and dedicated computer (e.g., a personal computer, or a server). Therefore, a large number of computers are needed when a plurality of robots need to be controlled.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
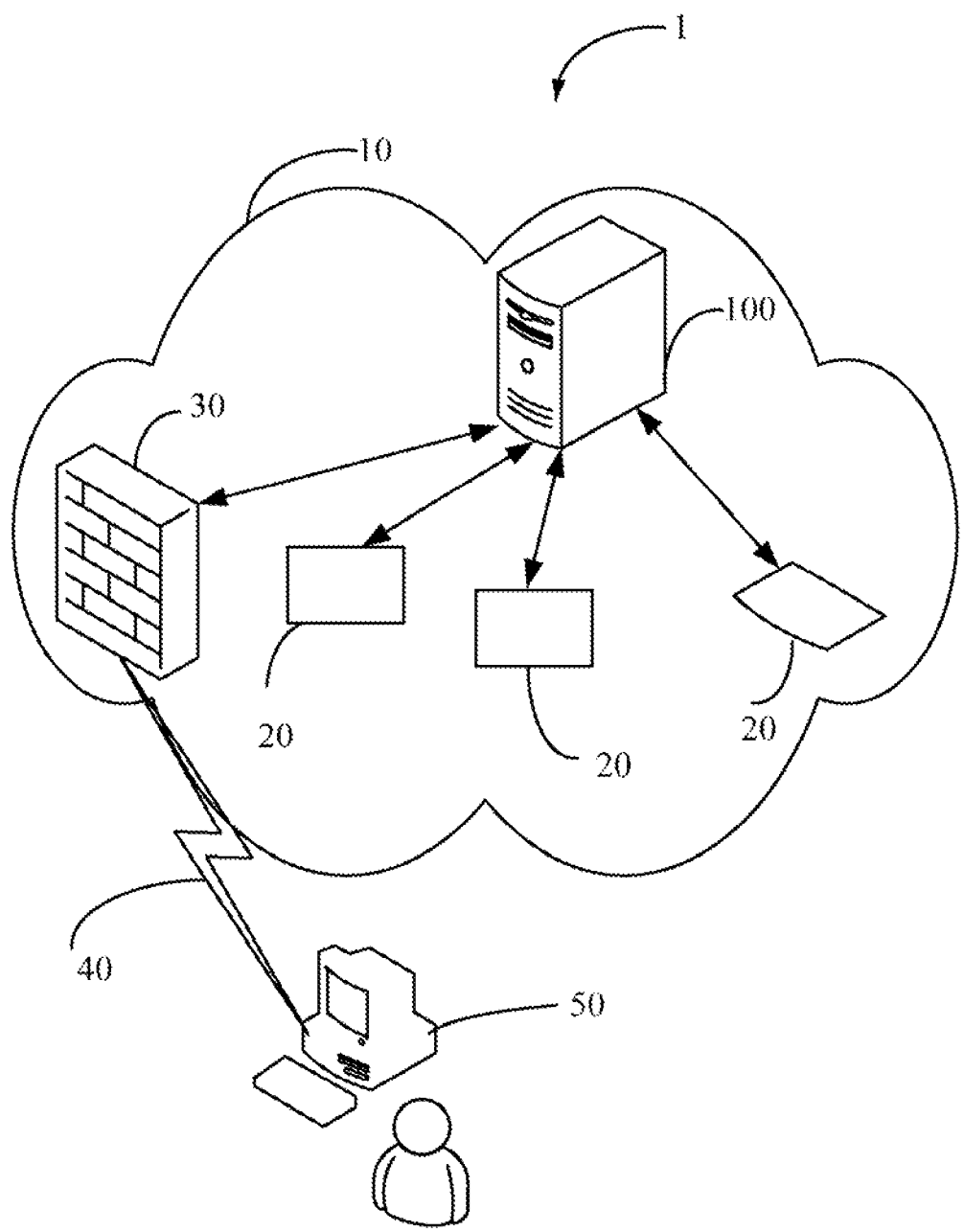
FIG. 1 is a system view of one embodiment of a robot control system.

FIG. 1 is a block diagram of one embodiment of a robot control system 1. In one embodiment, the robot control system 1 may include a data center 10, a network 40 and one or more clients 50. The robot control system 1 may be used to control one or more robots 20.

The data center 10 is located behind a firewall 30 and connected to the network 40. The network 40 may be, but is not limited to, a wide area network (e.g., the Internet) or a local area network. The firewall 30 is used to protect the data center 10 from unauthorized access and secure information safety of the data center 10. The data center 10 is designed for cloud computing capability and capacity and includes a plurality of cloud servers 100. The cloud servers 100 are connected to the one or more robots 20 wirelessly.

Each robot 20 is a mechanical intelligent agent which can perform tasks (e.g., vacuum cleaning.) In one embodiment, each robot 20 may be, but is not limited to, a mobile robot. The mobile robot has the capability to move around and is not fixed to one physical location. Each mobile robot includes one or more wheels or motors to move. Additionally, each robot 20 includes a global positioning system (GPS) device. The GPS device receives GPS signals from one or more satellites, and determines a longitude and a latitude of the robot 20.

The cloud server 100 is a dynamic host configuration protocol (DHCP) server. In one embodiment, the cloud server 100 assigns IP addresses to the client 50. The cloud server 100 may provide three modes for allocating IP addresses to the clients 50. The modes are dynamic allocation, automatic allocation, and static allocation. In one embodiment, the cloud server 100 uses dynamic allocation to assign the IP addresses to the clients 50. The cloud server 100 further sets a password (e.g., 123456$) and a name (e.g., apple) for enabling the client 50 to access the data center 10. The cloud server 100 also provides an access privilege for each client 50 according to the assigned IP address and the name. Additionally, the cloud server 100 may be a personal computer (PC), a network server, or any item of other data-processing equipment. Further details of the cloud server 10 will be described below.

The client 50 is electronically connected to the network 40. Additionally, the client 50 provides a user interface on the display for a user to access the data center 10 to control one or more operations of the cloud server 100. For example, the user may input a password and name by an input device (e.g., keyboard) into the user interface on the display to access the data center 10.

Figure 2:
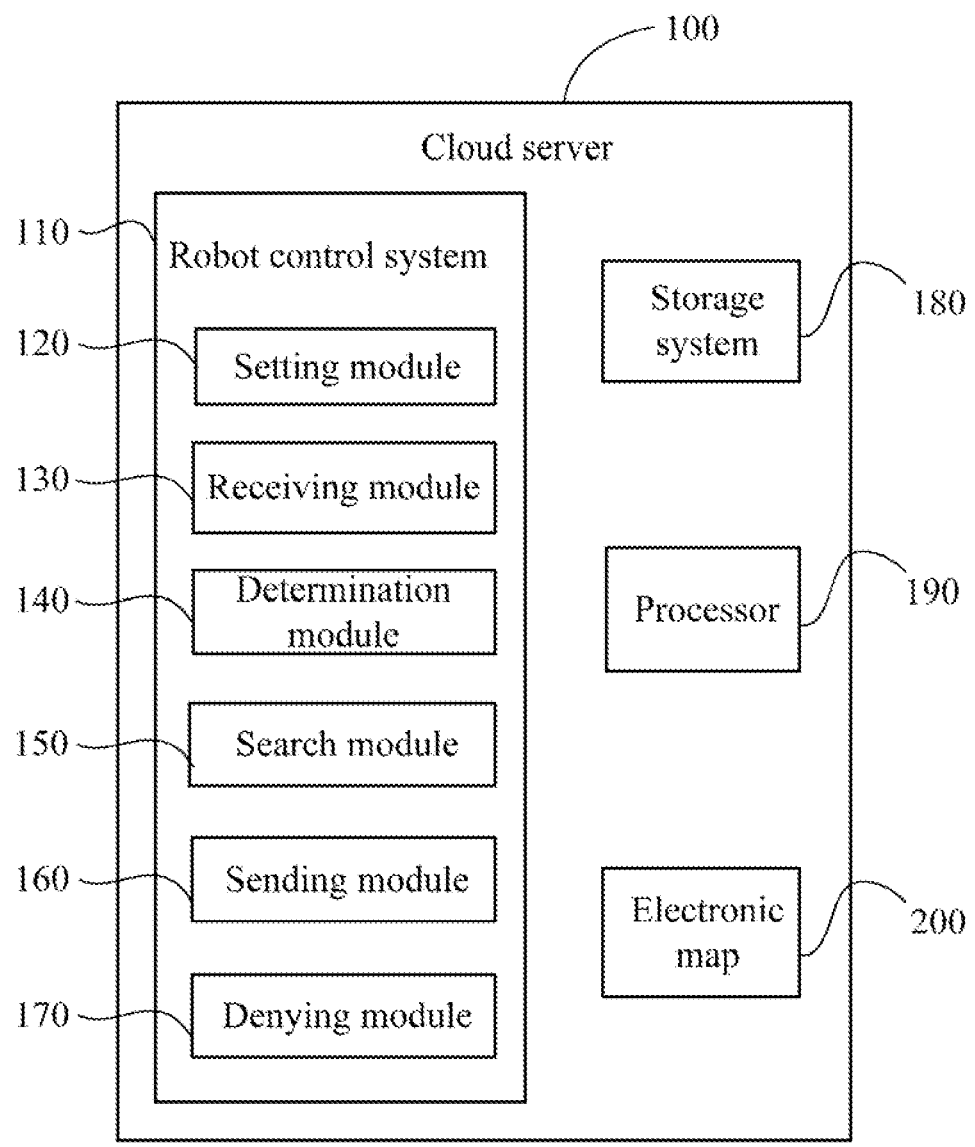
FIG. 2 is a block diagram of one embodiment of a cloud server included in FIG. 1.

FIG. 2 is a block diagram of one embodiment of the cloud server 100 including a robot control unit 110. The robot control unit 110 may be used to control the robots 20. In one embodiment, the cloud server 100 includes a storage system 180, at least one processor 190, and an electronic map 200. The electronic map 200 is used to display a location of the robot 20 according to the longitude and the latitude of the robot 20. In one embodiment, the robot control unit 110 includes a setting module 120, a receiving module 130, a determination module 140, a search module 150, a sending module 160, and a denying module 170. The modules 120-170 may include computerized code in the form of one or more programs that are stored in a storage system 180. The computerized code includes instructions that are executed by the at least one processor 190 to provide functions for the modules 120-170. The storage system 180 may be a cache or a memory, such as an EPROM, HDD, or flash memory.

The setting module 120 sets identification information used in order to access the cloud server 100 of the data center 10 and assigns the identification information to the client 50. In one embodiment, the identification information includes the name, the password, and the IP address of the client 50. The identification information of each client 50 is also stored in the storage system 180.

The receiving module 130 receives a login request to access the cloud server 100 of the data center 10 from the client 50. In one embodiment, the user inputs a name and a password in the user interface of the client 50. The client 50 generates the login request and sends the login request to the cloud server 100 of the data center 10. It is understood that the login request is defined as a command having information of the input name, input password and the IP address of the client 50.

The determination module 140 determines if the client 50 is permitted to access the cloud server 100 of the data center 10. In one embodiment, the determination module 140 compares the identification information of the client 50 that is stored in the storage system 180 with information contained in the login request, if the identification information is the same as the information contained in the login request, the client 50 is permitted to access the cloud server 100 of the data center 10. Otherwise, if the identification information is different from the information contained in the login request, the client 50 is not permitted to the cloud server 100 of the data center 10.

The receiving module 130 receives location information of each robot 20 from the GPS device of each robot 20, and receives location information of a task location from the client 50, in response to a determination that the client is permitted to the cloud server 100 of the data center 10. It is understood that the task location is a particular place where a task should be undertaken by the robot 20. In one embodiment, the location information includes a longitude and a latitude. In one embodiment, the user may input the location information of the task location in the clients 50.

The search module 150 locates a robot 20 which is closest to the task location according to the location information of all the robots 20 and the location information of the task location. In one embodiment, the search module 150 computes a route from each robot 20 to the task location on the electronic map 200 and determines a shortest route to the task location. For example, assuming that the two robots 20 are labeled as A and B, the search module 150 computes a first route from A to the task location and also computes a second route from B to the task location, the search module 150 finds out a shortest route from the first route and the second route. For example, if the first route is shorter than the second route, then A is determined to be closest to the task location.

The sending module 160 sends a command to the located robot 20 to move to the task location, wherein the command defines a task of the located robot 20 to perform. For example, the tasks may be vacuum cleaning. The sending module 160 sends the command to A to move to the task location to execute the task. For example, if the task is vacuum cleaning, the command includes content of the task and the location information of the task location. The content of the task includes information on how and what to perform the task. If the located robot 20 receives the command, the robot 20 moves to the task location according to the location information and perform vacuum cleaning according to the content of the task.

The denying module 170 denies the client 50 to access the cloud server 100 of the data center 10, in response to a determination that the client 50 is not permitted to the cloud server 100 of the data center 10.

Figure 3:
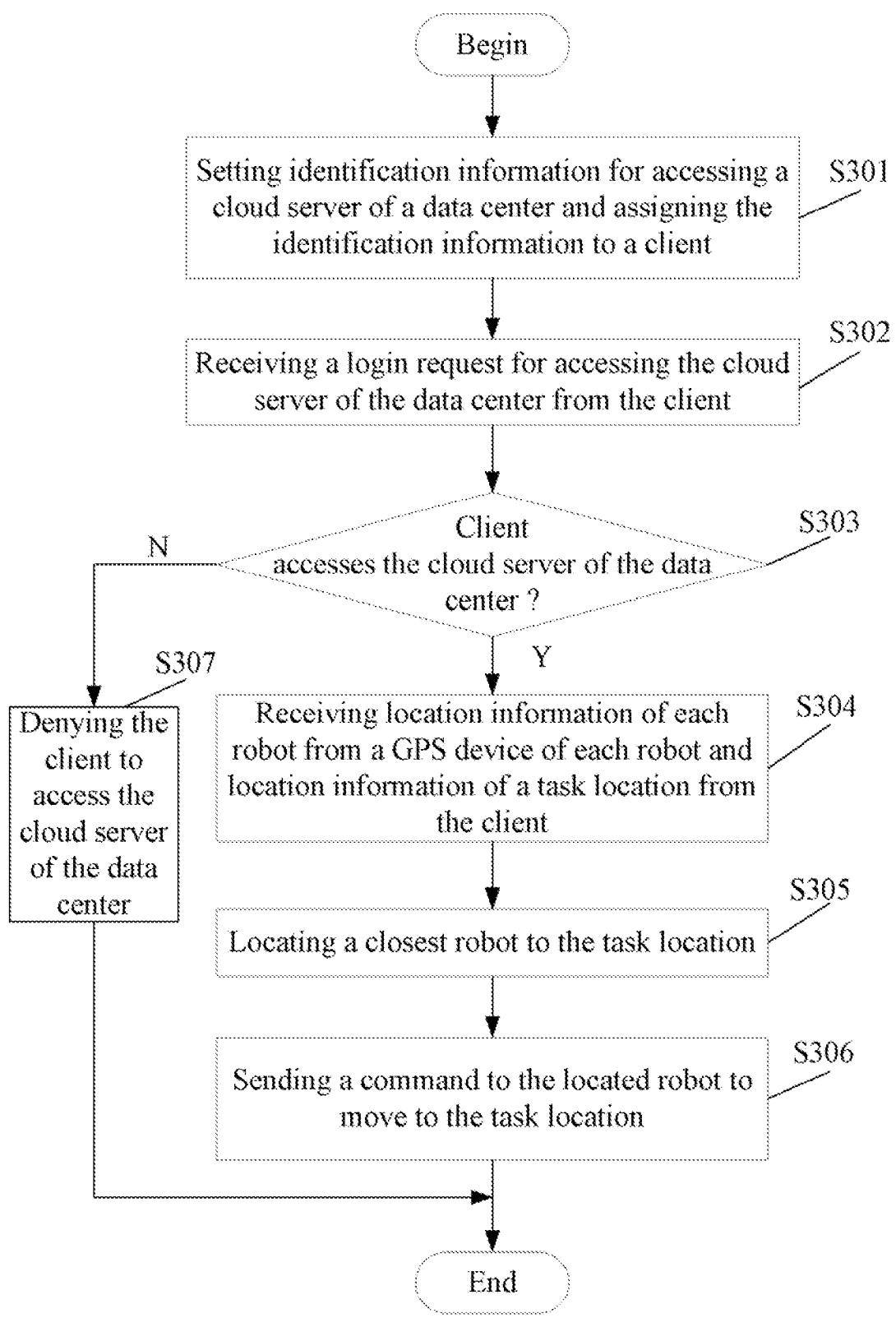
FIG. 3 is a flowchart of one embodiment of a robot control method.

FIG. 3 is a flowchart of one embodiment of a robot control method. Depending on the embodiment, additional blocks may be added, others deleted, and the ordering of the blocks may be changed.

In block S301, the setting module 120 sets identification information for accessing the cloud server 100 of the data center 10 and assigns the identification information to the client 50. As mentioned above, the identification information may include the name, the password, and the IP address of the client 50.

In block S302, the receiving module 130 receives a login request to access the cloud server 100 of the data center 10 from the client 50. As mentioned above, the user may input a name and a password in the user interface of the client 50 which is forwarded to the cloud server 100 of the data center 10 as part of the login request.

In block S303, the determination module 140 determines if the client 50 is capable of accessing the cloud server 100 of the data center 10. In one embodiment, the determination module 140 compares the identification information with the login request, if the identification information is different from the information contained in the login request, the client 50 is permitted to access the cloud server 100 of the data center 10, the procedure goes to the block S304. Otherwise, if the identification information is different from the information contained in the login request, the client 50 is not permitted to the cloud server 100 of the data center 10, the procedure goes to the block S307.

In block S304, the receiving module 130 receives location information of each robot 20 from the GPS device of each robot 20 and receives location information of a task location from the client 50. As mentioned above, the location information includes a longitude and a latitude.

In block S305, the search module 150 locates a robot 20 which is closest to the task location according to the location information of each robot 20. For example, assuming that the two robots 20 are labeled as A and B, the search module 150 computes a first route from A to the task location and also computes a second route from B to the task location, the search module 150 finds out a shortest route from the first route and the second route. For example, if the first route is shorter than the second route, then A is determined as the robot 20 which is closest to the task location.

In block S306, the sending module 160 sends a command to the located robot 20 to move to the task location, wherein the command defines a task of the located robot 20 to perform. For example, if the task is vacuum cleaning. The sending module 160 sends the command to A to move to the task location to execute the task.

In block S307, the denying module 170 denies the client 50 to access the cloud server 100 of the data center 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A cloud server of a data center, the cloud server in electronic communication with one or more robots, comprising:
 a storage system;
 at least one processor; and
 one or more programs stored in the storage system and being executable by the at least one processor, the one or more programs comprising:
 a receiving module operable to receive location information of each of the one or more robots from a GPS device of each of one or more robots, and to receive location information of a task location from a client in electronic communication with the cloud server, in response to a determination that the client is permitted to access the cloud server;
 a search module operable to locate a robot that is closest to the task location according to the location information; and
 a sending module operable to send a command to the located robot to move to the task location, wherein the command defines a task of the located robot to perform.

2. The cloud server of the data center of claim 1, wherein the located robot has a shortest route to the task location compared to the other one or more robots.

3. The cloud server of the data center of claim 2, wherein the shortest route to the task location is determined by computing a route from each robot to the task location on an electronic map stored in the cloud server.

4. The cloud server of the data center of claim 1, wherein the location information comprises a longitude and a latitude.

5. The cloud server of the data center of claim 1, wherein the robots are mobile robots.

6. A robot control method implemented by a cloud server of a data center, the cloud server in electronic communication with one or more robots, the cloud server comprising at least one processor, the method implemented by the at least one processor comprising:

the cloud server receives location information of each of the one or more robots from a GPS device of each of one or more robots, and receives location information of a task location from a client in electronic communication with the cloud server, in response to a determination that the client is permitted to access the cloud server;

the cloud server locates a robot which is closest to a task location according to the location information; and the cloud server sends a command to the located robot to move to the task location, wherein the command defines a task of the located robot to perform.

7. The method of claim 6, wherein the located robot has a shortest route to the task location compared to the other one or more robots.

8. The method of claim 7, wherein the shortest route to the task location is determined by computing a route from each robot to the task location on an electronic map stored in the cloud server.

9. The method of claim 6, wherein the location information comprises a longitude and a latitude.

10. The method of claim 6, wherein the robots are mobile robots.

11. A non-transitory computer-readable medium having stored thereon instructions that, when executed by a cloud server, the cloud server in electronic communication with one or more robots, causing the cloud server to perform a robot control method, the method comprising:

receiving location information of each of the one or more robots from a GPS device of each of one or more robots, and receiving location information of a task location from a client in electronic communication with the cloud server, in response to a determination that the client is permitted to access the cloud server;

locating a robot which is closest to a task location according to the location information; and sending a command to the located robot to move to the task location, wherein the command defines a task of the located robot to perform.

12. The non-transitory medium of claim 11, wherein the located robot has a shortest route to the task location compared to the other one or more robots.

13. The non-transitory of claim 12, wherein the shortest route to the task location is determined by computing a route from each robot to the task location on an electronic map stored in the cloud server.

14. The non-transitory of claim 11, wherein the location information comprise a longitude and a latitude.

15. The non-transitory of claim 11, wherein the robots are mobile robots.

* * * * *